Figure 1:
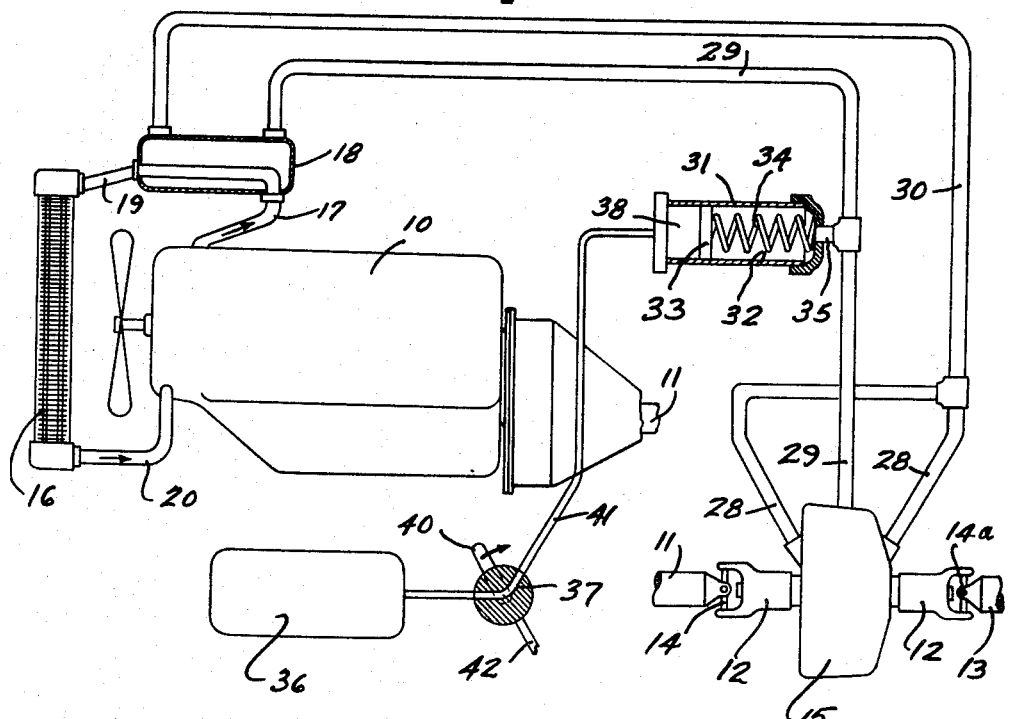

Inventors
JAMES H. BOOTH
EDWARD J. HERBENAR

United States Patent Office 2,963,118
Patented Dec. 6, 1960

2,963,118

HYDRODYNAMIC BRAKE SYSTEM

James H. Booth and Edward J. Herbenar, Detroit, Mich., assignors to Thompson Ramo Wooldridge Inc., a corporation of Ohio Filed Feb. 2, 1956, Ser. No. 563,032

7 Claims. (Cl. 188—90)

The present invention relates to a novel means for retarding the rotation of a shaft and, more particularly, concerns the provision of extremely simple, yet highly effective means for controlling the application and release of a hydrodynamic brake or the like.

In recent years the art of hydrodynamic brakes has been increasingly explored. This development work has succeeded in providing highly efficient hydrodynamic braking units of relatively small diameter suitable for use in dynamometers. The practicability of small diameter hydrodynamic brakes capable of absorbing large torques has led to attempts to employ such brakes in automotive vehicles, especially heavy duty vehicles such as are employed in the transport business. Some of these prior installations have been successful in limiting the downhill speed of such heavy duty vehicles but, to our knowledge, none of the prior art hydrodynamic brake systems for vehicles has provided a truly simple and yet completely effective control. Heretofore, controls for vehicular hydrodynamic brake systems incorporated high pressure circulating pumps, automatic relief valves to permit dumping of the system in the event of excessive loads and relatively complex hydraulic circuits.

In accordance with the principles of the present invention, an extremely simple system is provided in which the hydraulic circulating pump heretofore utilized, has been eliminated, along with separate automatic overload protection. Further, the present system incorporates means for substantially instantaneously relieving the application of braking pressure. At the same time, the hydrodynamic brake may be rendered operative in an extremely rapid manner or gradually, as the case may require. Further, hydraulic circuits are maintained at a minimum by providing a simple closed hydraulic braking fluid circuit which simultaneously operates to control the hydraulic fluid in the hydrodynamic brake and provide efficient cooling for the fluid during braking operation.

The important functions above set forth are accomplished in the system of the present invention through the provision of a closed hydraulic brake fluid circuit having a fluid inlet to the brake adjacent the center thereof and a fluid outlet adjacent the outer periphery thereof. The inlet and outlet are connected to a heat exchanger such that fluid flowing from the hydrodynamic brake through the outlet must pass through the heat exchanger before again being introduced to the brake. The hydraulic fluid is maintained in a completely closed system in a spring biased accumulator which attempts to provide a reservoir of sufficient size to accommodate sufficient hydraulic brake fluid to permit rotation of the hydrodynamic brake elements without appreciable braking effect. Fluid is forced from the reservoir into the hydrodynamic brake by compressed air under the control of a manual valve. The compressed air operates to compress the spring of the reservoir and force the hydraulic brake fluid to the closed hydraulic circuit, thereby forcing it to remain in the hydrodynamic brake to provide efficient braking action. In the event that an overload occurs in the brake, destruction of the system is prevented by expansion of the braking fluid into the reservoir against the compressed air. By controlling the pressure of the compressed air applied to the reservoir, the overload relief pressure may be extremely accurately controlled without employing separate relief valves and, further, without loss of hydraulic fluid in case of an overload pressure relief of the system. In view of the complete control thus afforded, and the automatic relief provided, the hydrodynamic brake of the present invention may be applied at any vehicle speed without damage to the system.

It is, accordingly, an object of the present invention to provide an improved, substantially simplified, hydrodynamic braking system and control therefor.

Another object of the present invention is to provide a hydrodynamic braking system for vehicles wherein the brake is applied by application of pressure to a reservoir containing hydrodynamic brake fluid.

Still a further object of the present invention is to provide a hydrodynamic brake control system wherein the hydrodynamic brake fluid may effectively be removed from the brake substantially instantaneously.

Another object of the present invention is to provide an improved closed-circuit hydrodynamic brake for the controlled retarding of a rotating shaft.

A feature of the present invention resides in the provision of a novel hydrodynamic brake fluid reservoir normally operative to maintain the hydrodynamic brake in a de-energized, fluidless, condition.

Still another feature of the invention resides in the provision of a completely closed hydraulic circuit in which the hydraulic fluid pressure is accurately controlled by the application of a pressurized gas to one wall of a reservoir containing overflow hydraulic fluid from the braking system.

Figure 2:
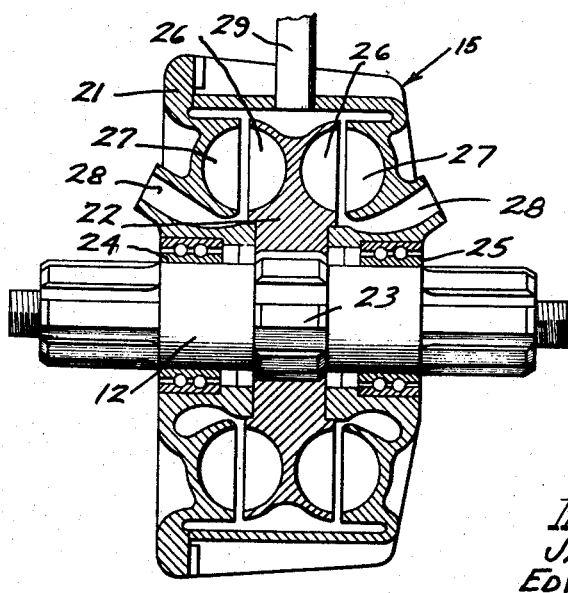

Still other and further objects and features of the present invention will at once become apparent to those skilled in the art from a consideration of the attached drawing wherein a preferred form of the invention is shown by way of illustration only, and wherein:

Figure 1 is a diagrammatic illustration of the hydrodynamic braking circuit of the present invention as applied to a vehicle; and Figure 2 is a cross-sectional view of a hydrodynamic brake adapted for utilization in the system of the present invention.

As shown on the drawings:

As may be seen from a consideration of Figure 1, the system of the present invention is constructed for cooperation with the conventional internal combustion engine 10 which operates to rotate a shaft 11. The shaft 11 is drivingly connected to an intermediate braking shaft 12 which in turn is connected to a final output shaft 13. Universal joints 14 and 14a may be provided between the brake shaft 12 and the shafts 11 and 13, if desired, in order to permit positioning of the hydrodynamic brake unit 15 conveniently relative to a fixed supporting member, such as for example a vehicle frame.

It is contemplated that the power plant 10 be liquid cooled and that the liquid coolant be circulated through a heat transfer unit 16, of conventional form. Water leaving the power plant 10 in the heated condition passes through conduit 17 to a second heat exchanger 18 and from thence flows into the top of the heat exchanger or radiator 16 via conduit 19. After cooling in the heat exchanger 16 it again returns via conduit 20 to the power plant.

It will, of course, be understood that although the system of the present invention is intended primarily for road vehicles of the heavy duty transport type, and accordingly the power plant 10 will be of the internal combustion type and the shaft 13 will operate to rotate vehicle drive wheels, nevertheless the hydrodynamic braking system of the present invention is equally adaptable to stationary dynamometer installations, industrial power applications, and the like. Accordingly, it is not intended that the present invention be limited in any way by the particular type of power plant 10 or output shaft 13.

In order to retard the vehicle and/or the power plant 10, the system of the present invention contemplates the provision of a hydrodynamic brake 15. The brake 15 has a housing 21 fixedly secured by any conventional means to the vehicle frame, not shown. As shown in Figure 2, a rotor 22, splined to shaft 12, as at 23, is rotatably mounted relative to the housing 21 in bearings 24 and 25. The specific construction of the hydrodynamic brake rotor 22 and the cooperating outer housing 21 may be conventional. Preferably the rotor 22 carries a plurality of pockets 26 opening axially of the shaft 12 and angled forwardly in the direction of rotation. Correspondingly, the stators preferably are provided with pockets 27 facing the pockets 26 and opening at an angle such that the cavities open rearwardly in the direction of rotor rotation, whereby the rotor pockets 26 and the stator pockets 27 cooperate with each other to provide a maximum retardation of liquid flow. The circulating flow of the brake is introduced via conduits 28 adjacent the inner operating periphery of the rotor. The brake fluid is forced, by the centrifugal action of the rotor 22 peripherally outwardly toward an outlet conduit 29 and, in the absence of any further controls, the peripheral force would cause a positive circulation of fluid from the inlets 28 to the outlet conduit 29.

As those skilled in the field are aware, hydrodynamic braking effort provided by structures such as shown in Figure 2, transforms kinetic energy in the drive shaft 12 into heat in the braking liquid. In many instances, this heat is dissipated through a cooling jacket surrounding the torque converter, or some other similar heat transfer system. In the system of the present invention, however, the hydraulic braking fluid itself comprises the cooling media and the circulation provided by the brake rotor 22 circulates the brake fluid through the conduit 29 into the heat exchanger 18 where it is placed in heat exchange relation with the circulating cooling liquid of the power plant 10. The cooled hydrodynamic brake liquid returns to the inlets 28 via return conduit 30.

The hydrodynamic brake circulating system is, as above set forth, entirely closed. It is not intended that air or other gas be in contact with the system and it is further preferred that the hydrodynamic braking fluid utilized in the system be capable of withstanding ordinary operating temperature without change to a gas. This is particularly desirable since the presence of vapor or gaseous constituents in the hydrodynamic brake liquid cause a serious decrease in the efficiency of the unit. The liquid, which is likewise substantially incompressible, such as for example lubricating oil or the like, is stored in a spring reservoir 31 comprising a liquid reservoir chamber 32 defined by the walls of the reservoir and a piston 33 moved toward the left as viewed in Figure 1 by means of a spring 34. In the position shown in Figure 1, the reservoir chamber 32 is at a partially full state, containing hydrodynamic braking liquid in contact with the liquid in the conduit 29 via conduit 35. The capacity of the reservoir 31 is preferably the same as or slightly greater than the capacity of the hydrodynamic brake unit 15. The proposed hydrodynamic brake system is accordingly filled with liquid in quantities sufficient to fill the conduits 29, 30, and 28, along with the hydrodynamic brake unit 15, without filling the chamber 32. Thus, with the reservoir piston 33 in its left hand position, and with rotation of the power plant 10, hydrodynamic braking fluid will fill the reservoir chamber 32 preventing any effective braking action from occurring within the hydrodynamic brake 15. When it is desired that braking effort be applied to the shaft 12, compressed air from an accumulator 36 is supplied via a two-way valve 37 to the chamber 38 in the reservoir 31. This air or other gas under pressure compresses the spring 34 forcing the piston 33 toward the right and forcing the hydraulic liquid in the chamber 32 into the conduit 29 thereby forcibly filling the hydrodynamic brake 15. The amount of filling provided at the brake 15 may accurately be controlled by the valve 37 which operates, when in the partially open condition, as a pressure throttling valve. When the valve 37 is completely open, the full pressure of the gas in the accumulator 36 is applied to the piston 33 providing a maximum hydrodynamic braking pressure control. When the pressure in the brake 15 and hence conduit 29 exceeds, in combination with the force of the spring 34, the force applied by the gas in the chamber 38, brake liquid moves into the reservoir 31 permitting partial discharge from the brake 15 with resultant decrease in effective torque absorption.

When it is desired that the brake 15 be rendered inactive after brake application, the valve 37 is rotated in clockwise direction by the lever 40 thereby connecting the conduit 41 to the atmosphere vent 42 while simultaneously blocking off flow from the accumulator 36. This action vents the chamber 38 to atmosphere and the spring 34 operates to move the piston 33 toward the left. In view of the braking pressure built up in the conduit 29, and the lack of pressure in the chamber 38, the piston 33 will be moved at an extremely rapid rate toward the left and all fluid will be drained from the brake 15 in substantially instantaneous manner. This draining is caused by a combination of the centrifugal force applied by the rotor 22 in the hydrodynamic brake 15 which tends to provide a positive force moving the fluid out of the brake, and an attempt of the piston 33 to move toward the left which tends to create a vacuum in the chamber 32. The result is, of course, that the liquid leaves the brake 15 to fill the void in the chamber 32 with an almost instantaneous elimination of braking pressure.

The accumulator 36 may be charged periodically with an air pressure source, such as available at conventional filling stations or, alternatively, may be supplied by means of any compressed air pump driven by the power plant 10. In the case of heavy duty transport vehicles such a source of compressed air is often available for purposes of brakes at the vehicle wheels. In such installations, the reservoir 36 may, of course, be continually supplied from the common air pressure source.

It will thus be seen that an extremely simple and yet fast acting control system is provided for hydrodynamic brakes of the type constructed for use with a liquid cooled power plant driving a rotary output shaft. By providing a completely closed hydraulic brake circuit, a nonvolatile brake fluid may successfully be utilized and, through the utilization of the spring reservoir, an accurate control of the hydraulic brake liquid in the actual braking circuit is accomplished. Thus, through the utilization of a single control valve and a simple reservoir complete brake control is provided. At the same time, cooling of the brake is accomplished through a relatively simple heat exchanger system thereby eliminating complex hydraulic circuitry. It will be noted that a further advantage of the present system lies, when utilized in connection with heavy duty transports engaged in mountain travel in the provision of means for maintaining the temperature of the power plant 10 at a desired elevated value. When heavy duty transport trucks make long downgrades in mountain travel there is a strong tendency for the power plant to become excessively cool as a result of inactivity. Since such downgrades provide the main use for the hydrodynamic brake 15, circulation of hot braking fluid through the heat exchanger 18 will maintain the temperature of the power plant 10 at a relatively high, optimum value.

It will be apparent to those skilled in the art that variations and modifications may be made in the above structure without departing from the scope of the novel concepts of the present invention and it is our intention, therefore, that the scope of the present invention be limited solely by that of the hereinafter appended claims.

We claim as our invention:

1. In combination, a shaft, a power plant for rotating said shaft, a hydrodynamic brake associated with said shaft for retarding the rotation thereof, said brake comprising a rotor secured to said shaft and rotatably mounted in a cooperating closed housing, brake fluid in said housing, a closed brake fluid circulating system including an inlet conduit for conducting fluid into said housing and an outlet conduit providing a fluid relief from said housing, a heat exchanger connecting said inlet and outlet conduits and placing said brake fluid in isolated heat transfer relation with a coolant, and means connected to one of said conduits resiliently acting against the fluid to move the fluid in the conduits rapidly into the brake under adjustable predetermined high positive resilient pressure while maintaining confinement of the fluid in the circulating system, said means having a displaceable volume approximately equal to the fluid volume of the brake.

2. In combination, a shaft, a power plant for rotating said shaft, a hydrodynamic brake associated with said shaft for retarding the rotation thereof, said brake comprising a rotor secured to said shaft and rotatably mounted in a cooperating closed housing, brake fluid in said housing, a closed brake fluid circulating system including an inlet conduit for conducting fluid into said housing and an outlet conduit providing a fluid relief from said housing, a heat exchanger connecting said inlet and outlet conduits and placing said brake fluid in isolated heat transfer relation with a coolant, and means connected to one of said conduits for selectively rapidly introducing thereto or withdrawing therefrom brake fluid while maintaining confinement of said fluid, said last named means comprising a reservoir housing, a piston reciprocably mounted in said housing and dividing said housing into a first chamber in fluid connection with said one conduit and a second chamber, and means for varying the pressure in said second chamber to increase the pressure in said first chamber to move fluid into said housing at a predetermined high yielding pressure above which pressure said chamber will expand and the brake will partially unload.

3. In combination, a shaft, a power plant for rotating said shaft, a hydrodynamic brake associated with said shaft for retarding the rotation thereof, said brake comprising a rotor secured to said shaft and rotatably mounted in a cooperating closed housing, brake fluid in said housing, a closed brake fluid circulating system including an inlet conduit for conducting fluid into said housing and an outlet conduit providing a fluid relief from said housing, a heat exchanger connecting said inlet and outlet conduits and placing said brake fluid in isolated heat transfer relation with said liquid coolant, and means connected to one of said conduits for selectively rapidly introducing thereto or withdrawing therefrom brake fluid while maintaining confinement of said fluid, said last named means comprising a reservoir housing, a piston reciprocably mounted in said housing and dividing said housing into a first chamber in fluid connection with said one conduit and a second chamber, means for varying the pressure in said second chamber to move the piston to resiliently force fluid from said first chamber into said conduits to charge the brake, and biasing means constantly acting on said piston and tending to enlarge said first chamber, the maximum volume of fluid moved by said piston from said first chamber being approximately equal to the full braking fluid volume of the brake chamber.

4. In combination, a shaft, a power plant for rotating said shaft, a liquid coolant circulating system for cooling said power plant, a hydrodynamic brake associated with said shaft for retarding the rotation thereof, said brake comprising a rotor secured to said shaft and rotatably mounted in a cooperating closed housing, brake fluid in said housing, a closed brake fluid circulating system including an inlet conduit for conducting fluid into said housing and an outlet conduit providing a fluid relief from said housing, a heat exchanger connecting said inlet and outlet conduits and placing said brake fluid in isolated heat transfer relation with said liquid coolant, and means connected to one of said conduits for selectively rapidly introducing thereto or withdrawing therefrom brake fluid while maintaining confinement of said fluid, said last named means comprising a reservoir housing, a piston reciprocably mounted in said housing and dividing said housing into a first chamber in fluid connection with said one conduit and a second chamber, means for selectively introducing a fluid under pressure into said second chamber or venting said second chamber to atmosphere.

5. In combination, a shaft, a power plant for rotating said shaft, a liquid coolant circulating system for cooling said power plant, a hydrodynamic brake associated with said shaft for retarding the rotation thereof, said brake comprising a rotor secured to said shaft and rotatably mounted in a cooperating closed housing, brake fluid in said housing, a closed brake fluid circulating system including an inlet conduit for conducting fluid into said housing and an outlet conduit providing a fluid relief from said housing, a heat exchanger connecting said inlet and outlet conduits and placing said brake fluid in isolated heat transfer relation with said liquid coolant, and means connected to one of said conduits for selectively rapidly introducing thereto or withdrawing therefrom brake fluid while maintaining confinement of said fluid, said last named means comprising a reservoir housing, a piston reciprocably mounted in said housing and dividing said housing into a first chamber in fluid connection with said one conduit and a second chamber, means for selectively introducing a fluid under pressure into said second chamber or venting said second chamber to atmosphere, and biasing means constantly acting on said piston and tending to enlarge said first chamber.

6. In combination, a shaft, a power plant for rotating said shaft, a liquid coolant circulating system for cooling said power plant, a hydrodynamic brake associated with said shaft for retarding the rotation thereof, said brake comprising a rotor secured to said shaft and rotatably mounted in a cooperating closed housing, brake fluid in said housing, a closed brake fluid circulating system including an inlet conduit for conducting fluid into said housing and an outlet conduit providing a fluid relief from said housing, a heat exchanger connecting said inlet and outlet conduits and placing said brake fluid in isolated heat tranfer relation with said liquid coolant, and means connected to one of said conduits for selectively rapidly introducing thereto or withdrawing therefrom brake fluid while maintaining confinement of said fluid, said last named means comprising a reservoir housing, a piston reciprocably mounted in said housing and dividing said housing into a first chamber in fluid connection with said one conduit and a second chamber, means for selectively introducing a fluid under pressure into said second chamber or venting said second chamber to atmosphere, and a spring in said first chamber compressed between said piston and the end of said first chamber adjacent the point of connection thereof with said one conduit and acting to bias said piston toward said second chamber to enlarge said first chamber.

7. In combination, a shaft, a hydrodynamic brake associated with said shaft for retarding the rotation thereof, a closed brake fluid circulating system including an inlet conduit for conducting fluid into said brake and an outlet conduit providing a fluid relief from said brake, means connecting said conduits into a closed system, and means for selectively rapidly introducing thereto at a predetermined adjustable high yielding pressure or withdrawing therefrom brake fluid while maintaining confinement of said fluid, said means including means in said closed system displacing a maximum volume of fluid approximately equal to the full braking volume of said brake and including means applying said pressure to said displacing means to yieldingly displace fluid into said brake.

References Cited in the file of this patent

UNITED STATES PATENTS

| | | |
|---|---|---|
| 1,569,143 | Robinson | Jan. 12, 1926 |
| 1,903,699 | Johansson | Apr. 11, 1933 |
| 1,987,889 | De La Mater | Jan. 1, 1935 |
| 2,055,297 | Lane | Sept. 22, 1936 |
| 2,170,128 | De La Mater | Aug. 22, 1939 |
| 2,392,120 | Carlson | Jan. 1, 1946 |
| 2,453,877 | Trail | Nov. 16, 1948 |
| 2,496,497 | Russell | Feb. 7, 1950 |
| 2,750,009 | Pohl | June 12, 1956 |

FOREIGN PATENTS

| | | |
|---|---|---|
| 1,132,673 | France | Nov. 5, 1956 |
| 471,117 | Great Britain | Aug. 24, 1937 |